Patented Nov. 7, 1944

2,361,997

UNITED STATES PATENT OFFICE 2,361,997

PRODUCTION OF ORGANIC COMPOUNDS

Henry Dreyfus, London, England, assignor to Celanese Corporation of America, a corporation of Delaware No Drawing. Application October 1, 1941, Serial No. 413,195. In Great Britain August 22, 1940

4 Claims. (Cl. 260—449.6)

This invention relates to improvements in the production of organic compounds, and is more particularly concerned with the production of hydrocarbons by reacting carbon monoxide and hydrogen.

Valuable hydrocarbons can be obtained by reacting carbon monoxide and hydrogen at relatively low temperatures and under ordinary or slightly increased pressure. Such a process can be carried out with the use of a liquid reaction medium in which the catalyst is immersed, see, for instance, U. S. Application Ser. No. 237,467 filed October 28, 1938. The use of such a liquid reaction medium facilitates the withdrawal of the considerable quantity of heat evolved in the process which causes boiling of the reaction medium, the vapour thus produced being condensed and returned to the reaction zone by means of a reflux condenser.

According to the present invention the production of hydrocarbons by reacting carbon monoxide and hydrogen is effected by introducing the reactant gases into a reaction medium prepared by dissolving in an organic liquid inert to the reactants and reaction products a salt of a metal catalytically active in the process and distilling products from the reaction medium as they are formed. In this way it has been found possible to effect a general improvement in the production of hydrocarbons and especially of normally liquid hydrocarbons not merely from the point of view of heat control but also with regard to the conversions obtained and with regard to the simplicity of the operating technique.

The liquid reaction medium employed may, most suitably, be of hydrocarbon nature, and may be one of relatively high boiling point, for instance anthracene oil, and in this case the process may be operated so that the product distilling from the reaction zone consists substantially of those of the products of the reaction between carbon monoxide and hydrogen which boil at temperatures up to the reaction temperature together with a portion of the higher boiling products. On the other hand a lower boiling hydrocarbon may be used which will distil with the products from the reaction zone and in this case it is necessary to return part of the condensed liquid or add fresh liquid in order to maintain the level of reaction medium within the reaction zone. It is preferred in practice to use as the liquid reaction medium a quantity of the liquid hydrocarbons which are produced by the process of the invention and there may be used in this way either a liquid of the composition produced by the reaction or a fraction thereof of any desired boiling range. When employing a reaction medium of the same composition as the condensable products of the reaction it is possible to adjust the rate of feed of carbon monoxide and hydrogen so that the products distil off at such a rate as to maintain a constant volume of liquid in the reaction zone.

Temperature control of the reaction can be effected very efficiently by circulating the reaction medium between the reaction zone and a cooler, an accurate control of temperature being possible by controlling the rate at which the reaction medium is circulated between the two vessels. On the other hand the distillation of the reaction products from the reaction medium continuously with their production itself effects a considerable removal of the heat produced in the process.

As previously indicated, the catalyst metals used are dissolved in the reaction medium, and in this connection it is pointed out that higher fatty acid salts of the catalytic metals are generally of greatest use in view of their solubility in the reaction media used, such salts as the stearates, palmitates and laurates being very satisfactory, while other soluble salts which may be used are the salts of resin acids, and compounds of lower molecular weight such as the acetoacetates. Nickel and cobalt are catalytic metals of great value in the process of the invention, especially when employed in conjunction with copper, and/or manganese and these metals may be used, for instance in the form of salts of the type referred to above, if desired together with activators such as thorium compounds, e. g. thoria, or other metal oxides e. g. alumina, magnesia or zinc oxide, which may be suspended in the solution of catalyst salt. Iron also exerts a favourable catalytic influence on the reaction but is generally less suitable than nickel or cobalt unless somewhat higher temperatures than 200° C. are used. If desired, before passage through the solution of a mixture of carbon monoxide and hydrogen for the synthesis of hydrocarbons, hydrogen alone may be passed, preferably at the temperature to be used in the synthesis.

The quantity of metal salt dissolved in the reaction medium can be quite small and need not exceed 1 or 2% of the weight of the reaction medium, while quantities much smaller than this e. g. down to 0.2 to 0.3% can be used if desired. On the other hand it is to be understood that higher proportions of the metal salts can be used if desired, e. g. solutions of 10-20% concentration or even saturated solutions. As previously indicated, the reaction is one which is carried out very efficiently at relatively low temperatures, preferably not exceeding 200° C., for instance temperatures of the order of 180-200° C. Atmospheric pressure may be employed and, although somewhat higher pressure can be used, it is preferred not to exceed a pressure of about 5 atmospheres, while if desired sub-atmospheric pressure, e. g. ½ to ¼ of an atmosphere may be used.

If desired the partial pressure of the reactants may be reduced by using a diluent gas, e. g. nitrogen, carbon dioxide, steam or methane, or other hydrocarbon gases or vapours, for instance gaseous hydrocarbons or the vapours of normal liquid hydrocarbons produced in the process itself and recycled as diluent. The quantity of diluent used may be equal to about the volume of the carbon monoxide and hydrogen mixture, or larger quantities, e. g. up to 5 or 10 parts by volume for each part of the reaction mixture may be employed.

The following example illustrates the invention.

*Example*

A catalyst is prepared by dissolving 40 parts by weight of metallic cobalt and 3.6 parts by weight of metallic copper in the minimum quantity of 40% nitric acid necessary. The solution is diluted to a concentration equivalent to 12.5 litres per kg. of cobalt and 10 parts by weight of thorium nitrate $Th(NO_3)_4 \cdot 12H_2O$ are added in the form of a 10% aqueous solution. To the mixed solution heated to its boiling point is added 150 parts by weight of sodium carbonate in the form of a 20-25% solution. The precipitated carbonates are filtered, washed free from nitrate, dried and dissolved in 400 parts by weight of lauric acid and the product is dissolved in a fraction of a hydrocarbon oil obtained by a previous synthesis and boiling above 220° C.

Hydrogen is passed through the solution at 195-200° C. for two to four hours and then a mixture of carbon monoxide with twice its volume of hydrogen is passed while maintaining the temperature of the liquid at between 195 and 200° C. The heat of reaction is partly removed by vaporisation of products obtained by the synthesis, these products being condensed and collected outside the reaction zone, and partly by circulation of the catalyst liquor through a cooler.

Having described my invention, what I desire to secure by Letters Patent is:

1. Process for the production of hydrocarbons by reacting carbon monoxide and hydrogen, which comprises introducing the reactant gases into a reaction medium prepared by dissolving in a hydrocarbon fraction boiling above the reaction temperature a salt of a metal selected from the group consisting of nickel, cobalt and iron catalytically active in the process and soluble in the reaction medium, and distilling the products from the reaction medium as they are formed.

2. Process for the production of hydrocarbons by reacting carbon monoxide and hydrogen, which comprises introducing the reactant gases into a reaction medium prepared by dissolving in a hydrocarbon liquid, inert to the reactants and reaction products, a higher fatty acid salt of a metal selected from the group consisting of nickel, cobalt and iron catalytically active in the process and soluble in the reaction medium, and distilling the products from the reaction medium as they are formed.

3. Process for the production of hydrocarbons by reacting carbon monoxide and hydrogen, which comprises introducing the reactant gases into a reaction medium prepared by dissolving in a hydrocarbon liquid, inert to the reactants and reaction products, a higher fatty acid salt of a metal selected from the group consisting of nickel, cobalt and iron and distilling the products from the reaction medium as they are formed.

4. Process for the production of hydrocarbons by reacting carbon monoxide and hydrogen, which comprises introducing the reactant gases into a reaction medium prepared by dissolving cobalt laurate in a hydrocarbon liquid, inert to the reactants and reaction products, and distilling the products from the reaction medium as they are formed.

HENRY DREYFUS.